Patented May 8, 1945

2,375,530

UNITED STATES PATENT OFFICE 2,375,530

COMPOSITION OF MATTER AND METHOD OF MAKING SAME

Melvin De Groote, University City, Bernhard Keiser, Webster Groves, and Arthur F. Wirtel, Kirkwood Mo., assignors to Petrolite Corporation, Ltd., Wilmington, Del., a corporation of Delaware No Drawing. Application June 21, 1943, Serial No. 491,732

4 Claims. (Cl. 260—405)

This invention relates to a new composition of matter, our present application being a continuation-in-part of our pending application Serial No. 440,750, filed April 27, 1942, now Patent No. 2,340,306.

One object of our invention is to provide a chemical product or compound that is particularly adapted for use as a demulsifier in the resolution of crude oil emulsions.

Another object of our invention is to provide a practicable method for manufacturing said new chemical product or compound.

Although one of the primary objects of our invention is to provide a new compound or composition of matter that is an efficient demulsifier for crude oil emulsions of the water-in-oil type, the said compound or composition of matter is adapted for use in other arts, as hereinafter indicated. It also may have additional uses in various other fields which have not yet been investigated.

The composition of matter herein described, particularly when it is intended to be used as a demulsifier for petroleum emulsions of the water-in-oil type, is obtained by the hydroxy-acetylation of blown or oxidized ricinoleic acid compounds, or compounds of the kind hereinafter described.

It is well known that oxidized oils can be obtained from castor oil, ricinoleic acid and various derivatives of ricinoleic acid, such as: Monoricinolein, diricinolein and polyricinoleic acids. They are produced by the common practice of blowing or oxidizing castor oil and similar fatty oils or acids, particularly non-drying unsaturated fatty oils, by means of a gaseous medium, such as air, oxygen, ozone, or ozonized air. The gaseous medium, such as air, may be moist or dry, and the oxididation may take place in the presence or absence of a catalyst. The catalyst may be of a metallic type, such as lead ricinoleate, cobalt ricinoleate, manganese ricinoleate, etc.; or it may be of the organic type which produces a peroxide such as alpha-pinene, linseed oil, etc. Oxidation may take place at atmospheric pressure or superatmospheric pressure, i. e., pressures up to or including 200 pounds gauge pressure, and at any temperature slightly above the boiling point of water, for instance, 120° C., up to any temperature which does not produce undue decomposition by pyrolytic reaction.

The time of blowing may be fairly brief, for example, 8-10 hours; or it may be quite extensive, for instance, as long as 10-12-14 days, the longer time periods being employed generally when the temperature is just slightly above the boiling point of water and when oxidation is with air at atmospheric pressure.

Mild oxidation, i. e., oxidation as exemplified by the exposure of a film of castor oil to air, for an extended period of time, such as weeks or even months (see Chemical Technology and Analysis of Oils, Fats, and Waxes, by Lewkowitsch, Sixth Edition, Volume 2, page 406) produces relatively small modifications of certain important indices, such as the iodine value, the acetyl value, and the saponification value. If drastic oxidation takes place, either by continued mild oxidation, or by more vigorous oxidation from the very beginning of the reaction, as induced by either a higher reaction temperature or the presence of a catalyst, then there is obtained an oxidized oil having characteristics which clearly indicate that drastic oxidation has taken place. These indices of drastic oxidation are a relatively low iodine value, such as 70 or less, and may be as low as 40, or thereabouts; a saponification value of 215 to 283, or thereabouts; an acetyl value of approximately 160-200; an increased viscosity such that the material may be hardly mobile at ordinary temperatures; a specific gravity of almost one, or a trifle over one at times; an increased refractive index; and, in the absence of other coloring matter, a yellow to deep orange color. The color at times may be a questionable index, since some oxidized castor oils are bleached to make them particularly adaptable for use as plasticizers in light colored resinoid bodies.

Drastically-oxidized castor oil can be prepared by well known methods, or such products can be purchased in the open market under various trade names, such as "blown castor oil," "blended castor oil," "blended bodied castor oil," "processed castor oil," "oxidized castor oil," "heavy castor oil," "viscous castor oil," etc. These various trade names appear to be applied to drastically-oxidized castor oils which differ merely in degree but not in kind.

The color of these oils is still pale or light colored in comparison with the oil from which they have been derived. Usually they are fairly transparent, particularly in reasonably thin layers, for instance, an inch or less. Such oils represent greater or lesser degrees of partial oxidation in the sense that there is a drastic change in comparison with the change that takes place when a film of castor oil is exposed to air.

For the sake of differentiation, oils of the kind previously described will be referred to as pale blown, drastically-oxidized castor oils; and the same terminology is intended to apply to all other ricinoleic bodies of the kind hereinafter described. In addition to pale blown, drastically-oxidized castor oil, there is also another type of the kind described in U. S. Patent No. 2,023,979, to Stehr, dated December 10, 1935. The product described in said Stehr patent is characterized by the fact that drastic oxidation is continued past the stage where a pale blown oil is obtained and where, as a matter of fact, a super oxidized product of almost semi-livery consistency is obtained.

Such products are usually much darker in color than the pale blown castor oils, for the reason that certain side reactions occur with the formation of dark colored by-products; and as a result, the transparency of the oil has greatly decreased or disappeared, and it is apt to be opaque in nature.

Attention is directed particularly to U. S. Patent No. 2,183,487, dated December 12, 1939, to Colbeth, to the extent that it discloses details as to the oxidation of castor oil in a manner that is particularly desirable.

Our preference is to subject a pale blown castor oil of the following characteristics, to hydroxyacetylation:

| | |
|---|---|
| Acid number | 15.1 to 25.0 |
| Saponification number | 230.5 to 274.0 |
| Iodine number | 43.5 to 55.0 |
| Acetyl number | 164.0 to 192.0 |
| Hydroxyl number | 188.0 to 220.0 |
| Percent unsaponifiable matter | 1.1 |
| Percent $SO_3$ | 0.0 |
| Percent ash | Trace |

The production of hydroxyacetylated blown castor oil or similar compounds is comparatively simple and is comparable to the manufacture of acetylated castor oil, except that hydroxyacetic acid or its equivalent, such as the anhydride or acyl chloride, is employed, and castor oil is replaced by the blown product. In view of the acetyl or hydroxyl value of blown castor oil, the principal reaction is obviously an esterification reaction in which the reaction is hastened or caused to go to completion by removal of any water formed. The usual procedures for promotion of esterification are well known, and involve one or more of the following: Employment of a temperature high enough to eliminate any water formed, for instance, 120–180° C.; sometimes the presence of a strong acid, such as a benzene-sulfonic acid in small amounts acts as a catalyst; sometimes it is expedient to pass an inert dried gas through the reacting mixture; at other times esterification may be conducted in the presence of a high boiling water-insoluble solvent, such as xylene or the like, which assists in removing the water in the form of vapors; the condensate so derived, both from the water vapor, and solvent vapor, is separated by gravity; and the solvent returned to the reacting chamber for further use.

The selection of suitable amounts of reactants in the manufacture of hydroxyacetylated blown castor oil is, of course, simple. The blown oil may be analyzed so as to determine its hyroxyl or acetyl value. Such value may be interpreted on the basis of each fatty acid radical present. The acetyl value or hydroxyl value may not correspond exactly to the alcoholic hydroxyl radicals attached to each high molal fatty acid acyl radical, but such value does correspond, at least approximately. The reason is that there may be present anyhydrides, or possibly, some compounds of unknown nature or stability, which affect the hydroxyl value determination. For convenience in the present instance, one may consider blown triricinolein in the same manner that it is sometimes convenient to consider triricinolein, i. e., as if it were a trihydric alcohol, and thus, one may obtain mono-hydroxyacteylated blown triricinolein, dihydroxyacetylated blown triricinolein, and tri-hydroxyacetylated blown triricinolein. For practical purposes, of course, there is no economical justification for obtaining a technically pure blown triricinolein and subjecting such material to hydroxyacetylation instead of employing blown castor oil.

Thus, the product particularly contemplated in the present instance is the compound or compounds obtained by the hydroxyacetylation of blown castor oil. For purposes of convenience, reference will be made to mono-hydroxyacetylated blown castor oil, di-hydroxyacetylated blown castor oil, and tri-hydroxyacetylated blown castor oil. Examination of the reaction between hydroxyacetic acid and castor oil, or hydroxyacetic acid and blown castor oil, indicates that water is formed and must be removed. Actually, the water formed may not necessarily be removed instantly, and thus, the water may undergo certain obvious reactions. Likewise, for reasons of economy, it may be desirable to use a highly concentrated hydroxyacetic acid instead of the anhydrous material as the selected reactant. In such instances, the water would readily enter into hydrolytic reactions with the blown castor oil, and thus, the product or composition which is actually hydroxyacetylated, may include compounds comparable to ricinoleic acid, polyricinoleic acid, monoricinolein and diricinolein. Generically, the expression "superglycerinated fats," or "superglycerinated triricinolein" refers to the mixture in which the mono-glycerides and di-glycerides are present. Specific terminology indicated in the present instance would be superglycerinated blown castor oil. Likewise, the acids and polymerized acids obtained from the blown castor oil, are sometimes referred to as a "blown castor oil estolide." (See U. S. Patent No. 2,079,762, dated May 11, 1937, to De Groote and Keiser.) In addition to the other products formed by hydrolysis, glycerol must be included. It is not intended in the present instance to claim the product obtained by hydroxyacetylation of glycerol, but it is to be noted that such material may be present cogenerically, for reasons indicated. Earlier references to the compounds herein contemplated, and particularly for use as a demulsifier, include hydroxyacetylated derivatives of blown ricinoleic acid compounds, and such expression is now suitably qualified so as to be limited to blown castor oil, blown triricinolein, blown superglycerinated castor oil, and blown castor oil estolides, and other specific compounds mentioned subsequently. The preferred example is the cogeneric mixture obtained by the hydroxyacetylation of blown castor oil. One may employ superglycerinated blown castor oil obtained by reaction between blown castor oil and glycerine, in the proportion of one or two moles of glycerol per mole of blown castor oil. This simply means that the product is obtained by rearrangement instead of hydrolysis. Obviously, one may also employ technically pure blown monoricinolein, technically pure blown diricinolein, and technically pure blown ricinoleic acid.

Although it is believed, in view of what has been said, that no further description is necessary in regard to the manufacture of hydroxyacetylated blown ricinoleic acid compounds, the following examples are included by way of illustration:

HYDROXYACETYLATED BLOWN CASTOR OIL

Example 1

1,000 pounds of pale blown castor oil corresponding to the tabular specification above is treated with 111 pounds of concentrated hydroxyacetic acid containing 30 percent of water. The reaction is conducted at 200–250° C. for approximately 2 hours. Completeness in reaction is indicated by the fact that elimination of water practically ceases, decrease in acid value and hydroxyl value of mixture, and elimination of free hydroxyacetic acid. The procedure is conducted in the usual reaction vessel of the kind employed for esterification, and may be constructed of any material which is resistant to the reactants. The amount of hydroxyacetic acid selected in the present instance is calculated so as to give substantially a monohydroxyacetylated blown castor oil.

HYDROXYACETYLATED BLOWN CASTOR OIL

Example 2

The same procedure is employed as in Example 1, preceding, except that twice the amount of hydroxyacetic acid is used.

HYDROXYACETYLATED BLOWN CASTOR OIL

Example 3

The same procedure is followed as in Example 1, preceding, except that three times the amount of hydroxyacetic acid is employed so as to yield substantially a tri-hydroxyacetylated blown castor oil.

HYDROXYACETYLATED BLOWN CASTOR OIL

Example 4

The same procedure is followed as in Examples 1 to 3, preceding, except that anhydrous hydroxyacetic acid is employed and water is removed immediately upon formation. The product so obtained represents hydroxyacetylated blown castor oil, or more especially, hydroxyacetylated blown triricinolein, in the presence of a minimum amount of hydroxyacetylated cogeners.

It is well known that the exact composition of ordinary oxidized castor oil is not known. This has been a matter of comment from time to time in the literature, including the patent literature dealing with the arts in which blown castor oil is contemplated. In view of such facts, it becomes even more difficult to attempt to indicate the nature of the products obtained by hydroxyacetylation of blown castor oil or the like. As has been previously indicated, esterification, and quite frequently, hydrolysis enters into the reaction, and it is quite probable, especially when aqueous hydroxyacetic acid is employed, that rearrangement, as exemplified by the formation of estolides, may take place.

Previous reference has been made to certain specific hydroxyacetylated derivatives of blown ricinoleic acid compounds. These additional members include blown diricinolein, blown monoricinolein, superglycerinated blown castor oil, i. e., castor oil which has been blown and then superglycerinated, as differentiated from one which is superglycerinated and then blown, and also blown ricinoleic acid and blown polyricinoleic acid.

The herein described chemical compounds or products are of distinct value as a break inducer in the doctor treatment of gasoline or the like, as described in U. S. Patent No. 2,157,223, to Sutton, dated May 9, 1939. Other additional uses include application as plasticizers, in plastics, synthetic resins, etc., and particularly in the acetate type, i. e., the cellulose acetate, vinyl acetate, and similar types.

Having thus described our invention, what we claim as new and desire to secure by Letters Patent is:

1. A hydroxyacetylated drastically - oxidized ricinoleic acid compound selected from the class consisting of blown castor oil, blown triricinolein, blown diricinolein, blown monoricinolein, blown superglycerinated castor oil, superglycerinated blown castor oil, blown ricinoleic acid, blown polyricinoleic acid, and blown castor oil estolides.

2. A hydroxyacetylated drastically - oxidized castor oil.

3. A tri-hydroxyacetylated drastically-oxidized castor oil.

4. In the manufacture of the compound described in claim 1, the steps of: (a) drastic oxidation of a ricinoleic acid compound selected from the class consisting of blown castor oil, blown triricinolein, blown diricinolein, blown monoricinolein, blown superglycerinated castor oil, superglycerinated blown castor oil, blown ricinoleic acid, blown polyricinoleic acid and blown castor oil estolides; and (b) hydroxyacetylation of said aforementioned drastically-oxidized ricinoleic acid compounds.

MELVIN DE GROOTE.
BERNHARD KEISER.
ARTHUR F. WIRTEL.